Figures 1, 7:
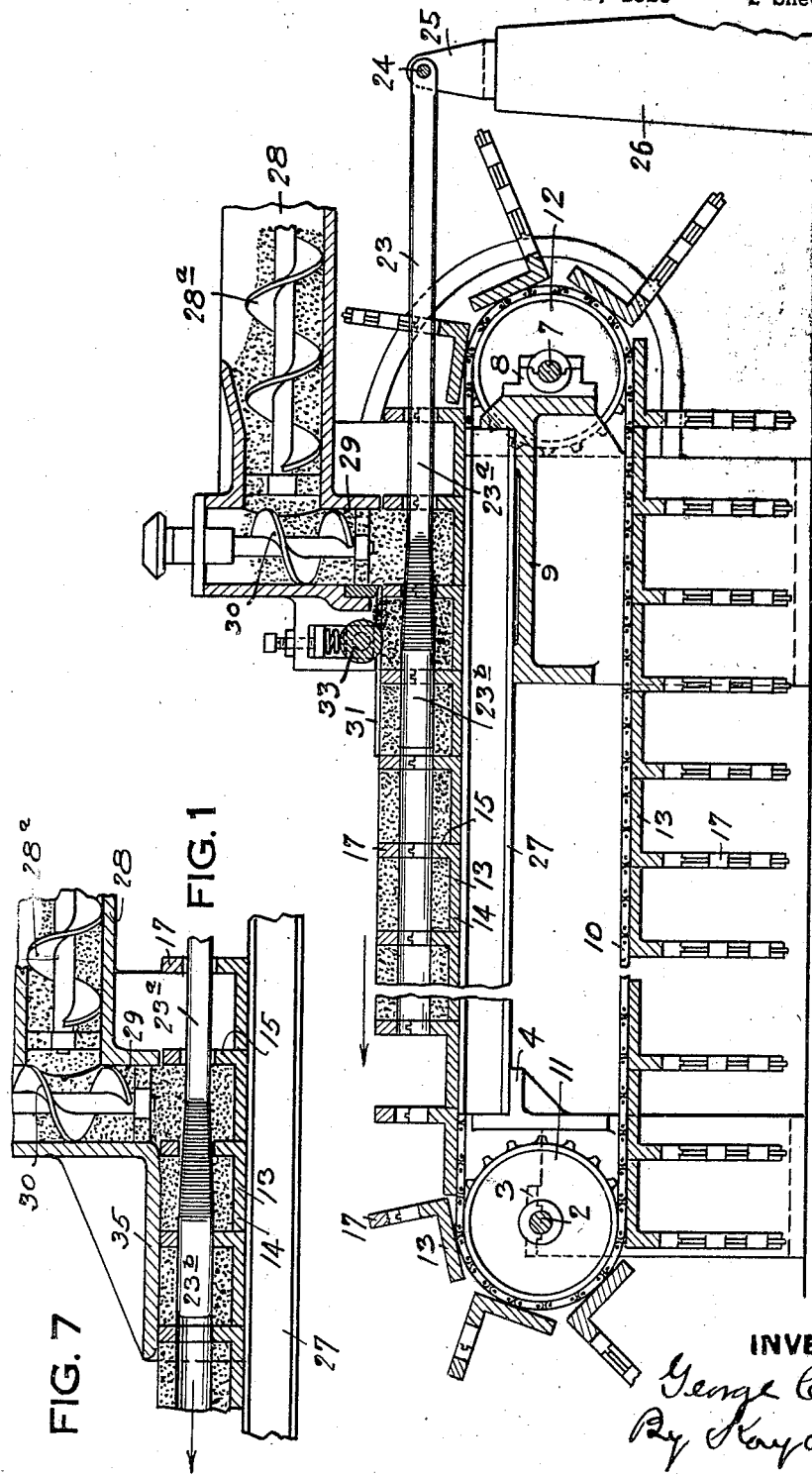

March 25, 1924.  1,487,726

G. C. DEBAY

MACHINE FOR MAKING CORED BLOCKS

Filed Dec. 2, 1920   2 Sheets-Sheet 1

INVENTOR
George C. Debay

March 25, 1924.
G. C. DEBAY
1,487,726
MACHINE FOR MAKING CORED BLOCKS
Filed Dec. 2, 1920    2 Sheets-Sheet 2
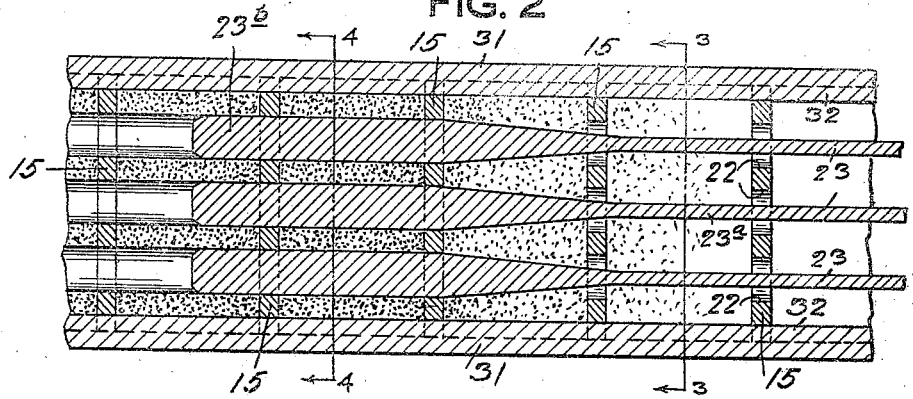
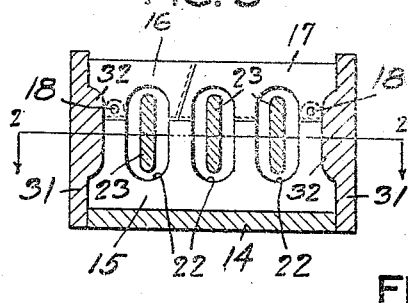
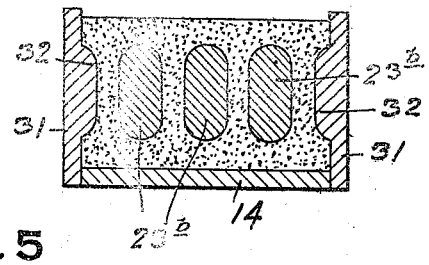
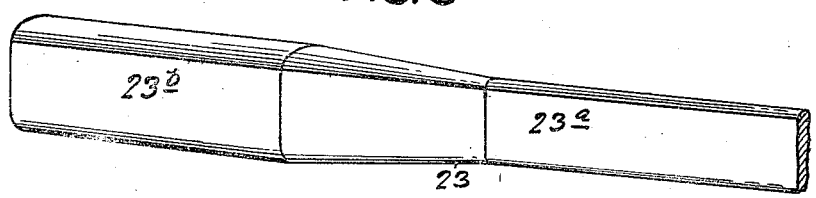
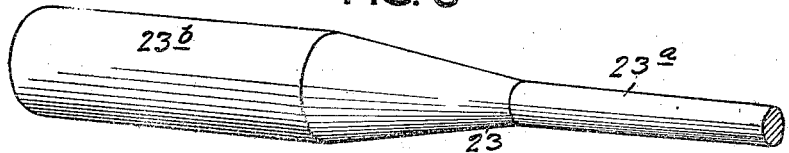
INVENTOR
George C. Debay Patented Mar. 25, 1924.

1,487,726

UNITED STATES PATENT OFFICE.

GEORGE C. DEBAY, OF SPRINGDALE, PENNSYLVANIA.

MACHINE FOR MAKING CORED BLOCKS.

Application filed December 2, 1920. Serial No. 427,829.

*To all whom it may concern:*

Be it known that I, GEORGE C. DE-BAY, a citizen of the United States, and resident of Springdale, in the county of Allegheny and State of Pennsylvania, have invented a new and useful Improvement in Machines for Making Cored Blocks; and I do hereby declare the following to be a full, clear, and exact description thereof.

My invention relates to machines for forming cored building-blocks of plastic material, and the method of making same.

In an application filed by me December 8, 1919, Serial No. 343,182, Patent No. 1,362,928, I have illustrated and described a machine of the same character.

In the accompanying drawings Fig. 1 is a longitudinal section of a machine similar to that described in said application, showing my present invention applied thereto; Fig. 2 is an enlarged horizontal section of several of the molds broken away; Fig. 3 is a section on the line 3—3, Fig. 2; Fig. 4 is a section in line 4—4, Fig. 2; Fig. 5 is a perspective view of a core-bar; Fig. 6 is a like view of a modified form of core-bar; and Fig. 7 shows a modified form of my invention.

In the drawings the numeral 2 designates a shaft mounted in suitable bearings 3 in the frame 4, said shaft being driven from any suitable source of power.

The shaft 7 is mounted in suitable bearings 8 in the frame 9, said shaft being in line with the shaft 3.

An endless conveyer or chain 10 is mounted on the sprocket-wheels 11 and 12 mounted on the shaft 2 and 7, respectively. Secured to the endless chain 10 are the mold-members 13 which form the bottom 14 and one of the sides 15 of the mold. The mold members are so mounted on the endless chain 10 as to have the necessary flexibility in passing around the wheels 11 and 12 as indicated in Fig. 1.

The side-plate 15 of the mold-member 13 has the upper portion made in two sections 16 and 17 hinged, as at 18, so as to be free to swing vertically. See Fig. 3.

The side portion 15 and the swinging sections 16 and 17 are cut away to form, in conjunction with each other, the openings 22.

Core-bars 23 are pivotally mounted as at 24 in the standards 25 on the pedestals 26, the number of said core-bars corresponding to the number of openings 22 in the mold-members 13, the upper ends of said core-bars being supported by said members, as indicated in Fig. 1. These core-bars vary in cross sectional area, having the attenuated portions $23^a$ and the full sized portions $23^b$ which fit snugly within the openings 22 of the mold-members 13.

Beams 27 are carried by the frames 4 and 9 and said beams form supports or guides for the mold-members 13 as they are brought up in position where the molding takes place, and where they receive the plastic material from which the blocks are to be formed.

The trough 28 is provided to receive the plastic material of which the blocks are to be formed, and within said trough is the spiral conveyer $28^a$ which delivers the material to the vertical chute 29. Within the chute 29 are the spiral conveyers 30 which force the material down into the molds. End walls are supplied for the molds during the formation of the blocks by the plates 31 which are supported by the frame of the machine, said plates being provided with the inwardly projecting portions 32 which form the customary grooves in the ends of the blocks. Instead, however, of using the spiral conveyers above described the material may be delivered to the machines in any other suitable manner, such as merely by passing by gravity from the chute 29 into said molds.

Beyond the chute 29 is the roller 33 which bears against the upper face of the block after it passes from the chute 29.

The plastic material from which the blocks are to be formed is delivered into the chute 29 and is forced downwardly by the spiral conveyers 30 and delivered into the molds as they come around in position continuously to receive the material. At this point of the delivery of the plastic material to the mold the attenuated portions $23^a$ of the core-bars are located, and the material forced down by the spiral conveyers 30 is delivered under considerable pressure to the molds and the material is packed around the said attenuated portions of the core-bars. As the molds continue to move in the direction of the arrows, Fig. 2, the material will be further compacted by the gradually increasing size of the core-bars, the material being confined by the walls of the mold. Finally the full sized portions $23^b$ of the core-bars come into play and completely fill the openings 22, as clearly indicated in Fig. 3.

In Fig. 7 instead of the roller 33 I employ a top-plate 35 which confines the material while the core-bar is compacting same.

By my invention I provide a machine which is continuously in operation in that the endless conveyer keeps bringing the molds into position for filling while the stationary core-bars pass through openings in said molds so that it is not necessary to withdraw the said core-bars, and the molds having open tops are always in position to be filled as they move along.

What I claim is:

1. In a machine for forming cored blocks of plastic material, the combination of an endless-conveyer, open-top molds carried thereby having openings in their walls, a horizontally extending core-bar passing through said openings having an attenuated portion at the point of the delivery of material to said molds.

2. In a machine for forming cored blocks of plastic material, the combination of an endless conveyer, open-top molds carried thereby having openings in their walls, a horizontally extending core-bar passing through said openings, and a roller in cooperative relation with said molds, whereby said roller acts on the upper surface of said blocks.

In testimony whereof, I, the said GEORGE C. DEBAY, have hereunto set my hand.

GEORGE C. DEBAY.

Witnesses:
ROBT. D. TOTTEN,
JOHN F. WILLS.